United States Patent [19]

Karr

[11] Patent Number: 4,493,134
[45] Date of Patent: Jan. 15, 1985

[54] ROPE CLAMPING DEVICE

[76] Inventor: Edward J. Karr, 3N430 Woodland Ave., West Chicago, Ill. 60185

[21] Appl. No.: 443,393

[22] Filed: Nov. 22, 1982

[51] Int. Cl.³ .................... F16B 2/02; F16G 11/00; H01R 13/58
[52] U.S. Cl. .................... 24/132 WL; 24/115 R; 24/132 R; 339/105; 339/244; 339/107; 403/311
[58] Field of Search ........... 24/115 N, 115 M, 115 R, 24/132 R, 285, 270, 19, 132 WL; 339/4, 244, 105, 107; 403/310, 311

[56] References Cited

U.S. PATENT DOCUMENTS

| 133,967 | 12/1872 | Crane ................................. 403/310 |
| 189,274 | 4/1877 | Smith ................................. 24/115 R |
| 245,652 | 8/1881 | Miller ................................. 403/311 |
| 866,144 | 9/1907 | Kobert ................................. 24/115 R |
| 3,188,381 | 6/1965 | Stillman, Jr. ......................... 339/105 |
| 3,813,636 | 5/1974 | Mason ............................. 339/244 R |
| 3,842,386 | 10/1974 | Suska ..................................... 339/4 |
| 4,116,514 | 9/1978 | Lawrence .............................. 339/4 |
| 4,342,494 | 8/1982 | Normann et al. ................... 339/105 |
| 4,391,226 | 7/1983 | Guthrie ............................ 24/132 R |
| 4,412,711 | 11/1983 | Suska ..................................... 339/4 |

FOREIGN PATENT DOCUMENTS 7426  2/1908  United Kingdom ............. 24/132 R

Primary Examiner—Victor N. Sakran
Attorney, Agent, or Firm—Robert V. Jambor

[57] ABSTRACT

A cable, wire or rope clamping device including a pair of plates having surfaces defining serpentine grooves to receive and retain segments of the article to be clamped. The plates are moveable between an open position for insertion of the segments and a closed position with the surfaces in closely spaced face-to-face relation to retain the segments within the grooves.

In one form the clamping device is formed of nonconductive material and is useable to connect or splice electrical conductors.

14 Claims, 5 Drawing Figures

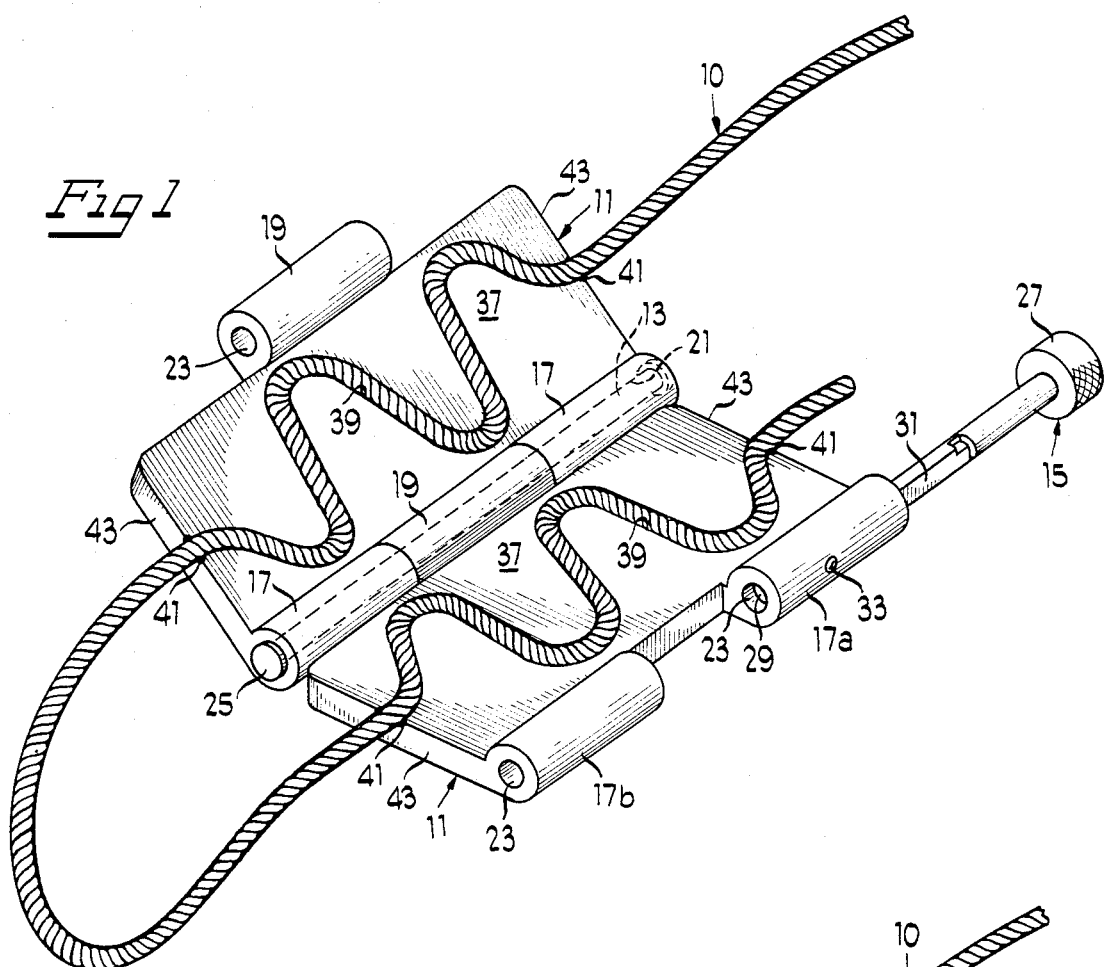
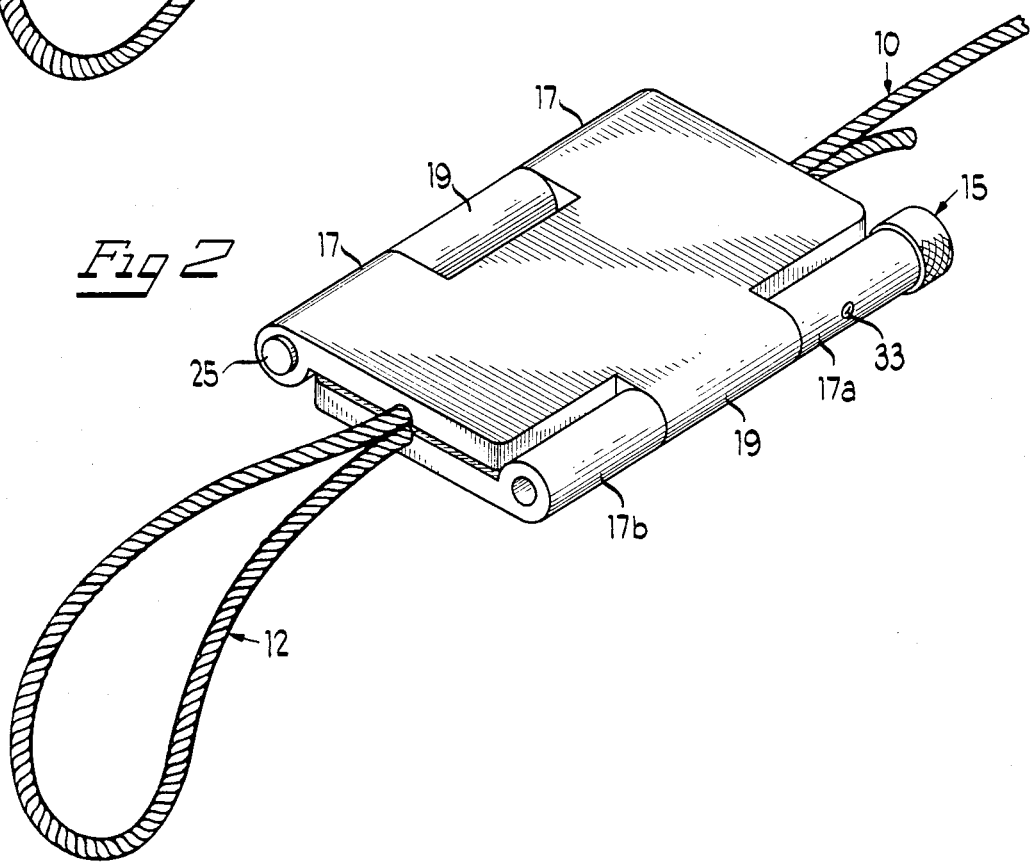

ROPE CLAMPING DEVICE

BACKGROUND OF THE INVENTION

This invention relates to a clamping device for securing lines of rope, wire or cable. More particularly, it relates to a device which retains the rope, wire or cable in a joined relation yet is readily disengageable to separate the joined elements.

DESCRIPTION OF PRIOR ART

Commonly, individuals experience difficulty in tying rope into an eye loop or Bolin's knot correctly. The same is true with relation to attempts at connection of two separate lines. Proper use of wire rope clips is also often a difficult problem.

Prior attempts to provide a simplied arrangement to satisfy these requirements typically involve a metal clamp with a threaded operator effective to clamp the rope, lines, or wire rope between two separable elements. Numerous examples of such rope and cable clamps exist. All possess the same disadvantage in that they require separate tools to use them, and are slow and difficult to attach or remove.

Another approach is shown in U.S. Pat. No. 866,144. There, a box like device includes two separate channels to receive two separate portions of rope. A pair of movable joint-like elements are provided which, on rotation of operator knobs, are adapted to physically displace the rope between spaced bars defining the outer longitudinal edges of the device. This arrangement requires actual displacement of the rope to perfect the locking relationship which must occur during the locking movement of the operators. Locking capability is dependent upon the compressive displacement effected within the clamped rope.

It is evident that use of this device is limited to readily compressible rope and that significant wear of the rope will result from frequent use of the device. Further, necessity for dual operators makes uniform locking along the length of the rope difficult if not impossible.

The present invention eliminates these difficulties. It embraces a readily attachable and removable device which does not subject the rope to excessive wear nor is it limited in application to readily compressible rope. It also eliminates the typing of knots or the use of wire rope clips or other forms of clamps or swaged fittings.

SUMMARY OF THE INVENTION

The present invention comprises a device, attachable to rope or cable which frictionally receives and retains segments of the rope or cable in interiorly formed serpentine grooves. The segments may be spaced segments of the same rope to thus form a loop, or may be segments of separate ropes to form a splice or connection between them. One embodiment includes a hinged casing or a frame having overlying serpentine "S" grooves, which when closed, clamp the segments of the rope upon each other. In another form plural overlying serpentine grooves are provided to receive and retain separate strands of an electrical conductor in contact with separate strands of a second conductor to splice them together.

DESCRIPTION OF THE DRAWINGS

FIG. 1 is a perspective view of a clamping device of the present invention in an open position.

FIG. 2 shows the clamping device of FIG. 1 in the closed position.

DETAILED DESCRIPTION

Figure 3:
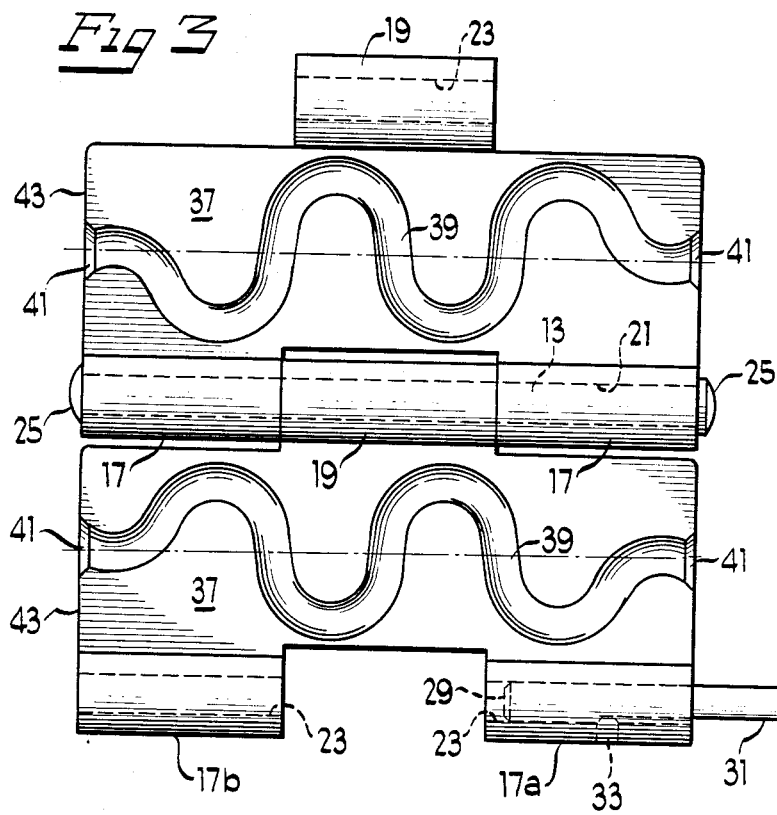
FIG. 3 is a plan view of the clamping device in the open position.

Referring now to the drawings, there is illustrated in FIGS. 1–4 a cable, wire or rope clamp embodying the principles of the present invention. The clamp is shown in connection with a rope 10 which is doubled over and clamped to form a loop 12. It must be appreciated, however, that the device is suitable for use with a cable or wire and may be used with equal effectiveness to connect two separate strands. The clamp includes a hinged body formed by two identical hinge plates 11 pivotally secured along one hinge longitudinal edge by pin 13. The plates 11 may be fastened or secured in an overlying closed position by a locking pin 15 disposed along the opposite edge.

Each plate 11 includes a pair of integrally formed, spaced bore defining barrels 17 along one longitudinal edge and a centrally disposed bore defining barrel 19 along the opposite edge. As best seen in FIG. 2, when the plates 11 are nested in overlying relation, the central barrel 19 of one plate is disposed between the spaced barrels 17 along an edge of the opposite. The barrels thus define aligned bores 21 and 23 which extend along each longitudinal edge.

The plates 11 are joined in hinge fashion by hinge pin 13 disposed in bore 21. Pin 13 includes swaged ends 25, which retains the pin within bore 21 and permanently join the plates. The plates pivot about pin 13 to move from open to closed positions (FIGS. 1 and 2).

Locking pin 15, is slideably received in bore 23 of one of the barrels 17a of one plate 11. It includes a knurled stop knob 27 at one end, which is larger than the bore 23. Opposite end 29 is of a diameter to slideably pass through bore 23 in central barrel 19 of the opposite plate 11 and bore 23 of associated barrel 17b, which when aligned forms bore 23. Pin 15 includes a flat 31 along a portion of its longitudinal extent. Barrel 17a, into which it is slideably received, includes a set screw or drift pin 33 which extends partially within bore 23. It mates with the flat 31 and prevents complete removal of locking pin 15.

Locking of the plates 11 in overlying relation is accomplished simply by moving pin 15 outwardly until end 29 moves completely into the barrel 17a. The plates are then closed to a face-to-face position with central barrel 19 disposed in alignment with spaced barrels 17a and 17b. Pin 15 is then slid into barrels 19 and 17b to lock the plates together. If desired, and as shown in FIG. 3, pin 15 may be provided cross slot 35, which aligns with set screw or pin 33 when locking pin 15 is fully inserted in bore 23. Partial rotation of knurled knob 27 will engage slot 35 with pin 33 and lock pin 15 against inadvertent removal.

Figure 4:
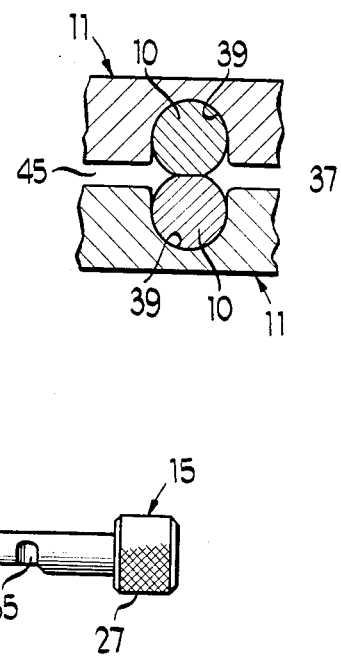
FIG. 4 is a sectional view of the clamp of FIGS. 1 and 2.

Each hinge plate 11 includes a facing surface 37 into which is formed a serpentine groove 39. As best seen in FIG. 4, the grooves are of a depth which approximately abut three quarters to eighty percent of the diameter of the element to be clamped.

As seen in FIG. 1, a segment of the rope 10 to be clamped is positioned within the groove 39 in one plate 11. If a loop is to be formed, a separate spaced portion of the same rope 10 is placed into the groove 39 in the opposite plate 11, after forming the loop 12 of appropriate size.

As seen in FIG. 3, the serpentine grooves 39 define a series of reverse bends which the rope 10 must assume when placed in the grooves. This arrangement impacts necessary frictional engagement to retain the rope segments within the clamp 11 when in the closed position.

The number of reverse bends is optional dependent upon the strength necessitated for the joint to be formed. It has been found that two complete 360° reversals, as is illustrated, is sufficient for most applications. As such, they represent the equivalent of two complete turns of a rope around a cylindrical post, or the like.

Each groove has an exit 41 along each transverse edge 43 of each plate 11. The exits are in general alignment with the imaginary longitudinal mid-line or centerline of each flat surface 37 such that the rope egresses centrally of the clamp when closed into its operative position.

The 360° reversals previously referred to are determined from the imaginary centerline. The rope path commences at an exit 41. Following the groove, it transcribes a 180° bend in one direction from the centerline and then a second 180° bend from the centerline in the opposite direction. This pattern is repeated and two full 360° bends are defined.

The grooves 39 of each plate 11 are arranged to overlie the groove 39 in the opposite plate when the plates are moved to the closed position of FIG. 2. The segment of rope 10 within each serpentine groove 39 presents an exposed surface in frictional contact with the segment of the rope in the groove of the opposite plate 11. This further enhances the retaining forces upon the rope segments within the clamp. Given the slight space 45 between the facing surfaces 37, and the approximate twenty to twenty-five percent larger diameter of the rope, as compared to the depth of the grooves 39, any rope, as compared to the depth of the grooves 39, any longitudinal pull on the loop, or on the rope itself, causes the rope segments to strain against the bends defining the serpentine grooves. Frictional engagement of the rope segments against each other and against the grooves 39 in surface 37 retain the rope segments in place.

Space 45 necessarily results from the tolerances of the pin and bore connections of the plates 11. As can be appreciated, this gap should be kept as small as is practically possible to insure tight frictional gripping of the rope or cable when the device is closed. Gap 45 should at least be such that there exists some compression of the rope when the clamp is closed, and preferably, the gap should be equal to or less than 25% of the diameter of the rope, wire or cable, and preferably, about 20% of such diameter.

It is contemplated that the grooves 39 of each plate 11 may be formed in a manner to proceed in opposite directions rather than be identically formed as illustrated. In that arrangement the clamped rope segments would cross each other at spaced intervals rather than overlie each other throughout the length of the grooves.

To utilize the clamp of FIGS. 1–4, locking pin 15 is rotated by knurled knob 27 to move set screw or drift pin 33 out of transverse slot 35 and align it with flat surface 31. Pin 15 is then withdrawn from barrel 17b and central barrel 19 sufficiently to permit hinge opening of plates 11 to expose facing surface 37.

Segments of a rope to be formed into a loop or spliced are disposed in the serpentine groove 39 of each plate 11. Plates 11 are pivoted about hinge pin 13 into the closed position with the facing surface 37 of one plate overlying the facing surface 37 of the other. Central barrel 19 is disposed intermediate barrels 17a and 17b to form aligned bore 23. Locking pin 15 is moved longitudinally into barrels 19 and 17b to lock the plates 11 in the closed position. Pin 15 is rotated to position screw or pin 33 in cross slot 35 to retain the elements in the locked position.

Figure 5:
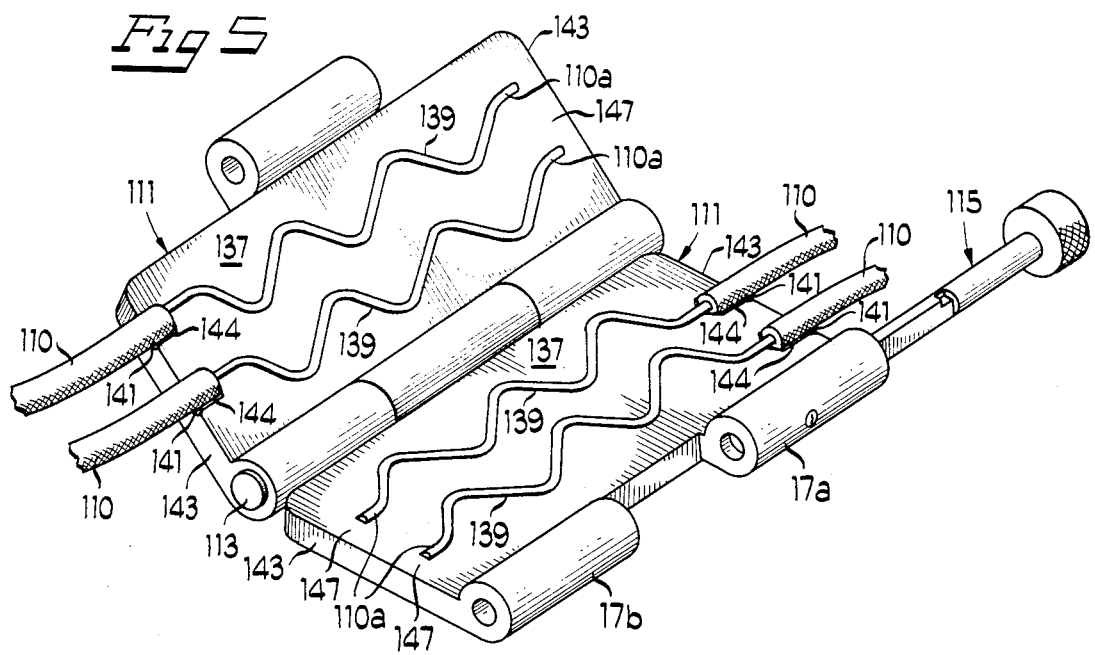
FIG. 5 is a view similar to FIG. 1 showing an alternate embodiment which forms an electrically insulated wire splice clamp.

FIG. 5 is illustrative of an alternate embodiment of the invention. Formed of non-conductive material, such as ceramic bakelete or suitable plastic, the clamp serves as a connector for electrical conductors. The clamp may be utilized to splice separate wires 110 together to form a continuous circuit. It should be appreciated that it is not necessary to clamp two conductors in each clamp. Rather, a clamp may be formed similar to that illustrated in FIGS. 1–4 to connect separate portions of only one wire.

The clamp includes a pair of hinge plates 111 similarly connected and arranged to the plates 11 of the embodiment of FIGS. 1–4. They include a joining hinge pin 113 and locking pin 115 such that the plates 111 may be moved between open and closed positions and locked in the closed position.

Plates 111 includes a facing surface 137 provided with two parallel serpentine grooves 139. The grooves of each plate are arranged to overlie corresponding grooves in the opposing plate. They are sized and arranged to receive uninsulated portions 110a of electrical conductors, and retain them in electrical contact with corresponding wires in the opposing plate.

The grooves 139 define serpentine paths sufficient to prevent pulling of the wires 110 from the grooves when the clamp is closed. The depth of the grooves 139 is such that the uninsulated portion 110a of the wires make electrical contact with each other, when the clamp is closed.

It should be noted, that in the embodiment of FIG. 5, the grooves have exits 141 at only one transverse edge 143 of each facing surface 137. The grooves terminate at a point spaced from the opposite transverse edge, and thus are closed by flats 147.

At each exit 141, there is provided an enlarged groove portion 144 intended to receive a portion of the outer insulation of each conductor 110. The enlarged portions 144 are sized to grasp a segment of the insulated portion of the wire between the portion 144 and the flats 147 on opposite facing surface 137 when the clamp is closed.

The exits 141 in one plate are at the opposite transverse edge 137 from those in the associated plate. In this way, the wires to be spliced may be inserted from opposite ends of the clamp and clamped together to form a set of continuous electrical connectors entering the clamp at one transverse edge and existing at the other.

Various features of the present invention have been shown and described in connection with the illustrated embodiments. It must be appreciated, however, that numerous modifications may be made without departing from the spirit and scope of the invention.

I claim:

1. A rope, wire or cable clamping device comprising:

a first plate including a surface provided with a serpentine groove to receive and retain a segment of a rope, wire or cable to be clamped;

A second plate including a surface provided with a serpentine groove to receive and retain a different segment of a rope, wire or cable to be clamped;

said plates being adopted to be positioned with said surfaces in closely spaced face-to-face relation and means to releasably secure said plates in said position;

said grooves being of a depth that is less than the thickness of the segment to be clamped, positioning of said plates with said surfaces in said closely spaced face-to-face relationship compressing said segments to be clamped therebetween; and wherein said plates are longitudinally elongated and said serpentine grooves are formed about a longitudinal cneter line thereof and extend for at least two 360° reversals of direction with respect to said centerline.

2. A clamping device as claimed in claim 1 wherein said serpentine grooves are of a depth of between 75 and 80 percent of the diameter of the segment to be clamped and the space between said surfaces when disposed in said closely spaced face-to-face relation is equal to the 25 percent or less of the diameter of the segment to be clamped.

3. A clamping device as claimed in claim 2 wherein the space between said surfaces when disposed in said closely spaced face-to-face relation is equal to about 20 percent of the diameter of the segment to be clamped.

4. A clamping device as claimed in claim 2 wherein said plates are longitudinally elongated and said serpentine grooves are formed about a longitudinal centerline thereof and extend for at least two 360° reversals of direction with respect to said centerline.

5. A clamping device as claimed in claim 4 wherein said serpentine groove in each said plate overlies the serpentine grooves in the other thereof when said surfaces are in said closely spaced face-to-face relation.

6. A clamping device as claimed in claim 4 wherein said serpentine groove in each said plate overlies the serpentine groove in the other thereof when said surfaces are in said closely spaced face-to-face relation.

7. A clamping device as claimed in claim 4 wherein said serpentine groove in one of said surfaces proceeds oppositely to that in the other thereof with respect to said centerline such that said grooves cross each other at spaced intervals.

8. A clamping device as claimed in claim 1 wherein said plates are hinged together and are moveable between an open position for insertion of said segments and a closed position with said groove defining surfaces in said closely spaced face-to-face relation.

9. A clamping device as claimed in claim 8 wherein said plates are identical and each includes a pair of spaced bore defining barrels along one longitudinal edge and a central bore defining barrel along the opposite longitudinal edge, said plates being disposed with the spaced bore defining barrels of one of said plates in alignment with the central bore defining barrel of the other thereof, with a hinge pin extending through said aligned bores, said plates being pivotal about said hinge pin to move said plates into said closed position.

10. A clamping device as claimed in claim 9 wherein said hinged plates are pivotal about said hinge pin to move said groove defining surfaces into said closely spaced face-to-face relation and when in said position to align the bores of said central bore defining barrel and spaced bore defining barrels at said longitudinal edge of said plates opposite from said aligned barrels receiving said hinge pin and a locking pin slideably received in one of said aligned bores of one of said spaced bore defining barrels at said opposite longitudinal edges slideable into said aligned bore of said central bore defining barrel and said other aligned spaced bore defining barrel to lock said plates into said closed position.

11. A clamping device as claimed in claim 1 wherein said plates are nonconductive and each defines at least one serpentine groove to receive and retain an uninsulated portion of an electrical conductor in contact with an uninsulated portion of a conductor received and retained in the other thereof.

12. A clamping device as claimed in claim 11 wherein each said serpentine groove defines an exit at one transverse edge of said plate and terminates at a point spaced from the opposite transverse edge to define a flat, each said groove including enlarged portion adjacent said exit to receive an insulated portion of the electrical conductors to be connected, said plates being disposed such that the exit on one of said plates is positioned at the opposite transverse edge to the exit of the other of said plates and the enlarged portions of said groove on one of said plates is aligned with the flat on the other thereof to compress and retain said insulated portion of said conductor therebetween.

13. A clamping device as claimed in claim 12 wherein each said plate defines two serpentine grooves each to receive and retain an electrical conductor in contact with an electrical conductor in the other of said plates.

14. A clamping device as claimed in claim 13 wherein said plates are identical and each includes a pair of spaced bore defining barrels along one longitudinal edge and a central bore defining barrel along the opposite longitudinal edge, said plates being disposed with the spaced bore defining barrels of one of said plates in alignment with the central bore defining barrel of the other thereof, with a hinge pin extending through said aligned bores, said plates being pivotal about said hinge pin to move said plates into said closed position; wherein said hinged plates are pivotal about said hinge pin to move said groove defining surfaces into said closedly spaced face-to-face relation and when in said position to align the bores of said central bore defining barrel and spaced bore defining barrels at said longitudinal edge of said plates opposite from said aligned barrels receiving said hinge pin and a locking pin slideably received in one of said aligned bores of one of said spaced bore defining barrels at said opposite longitudinal edges slideable into said aligned bore of said central bore defining barrel and said other aligned spaced bore defining barrel to lock said plates into said closed position.

* * * * *